Figure 1:
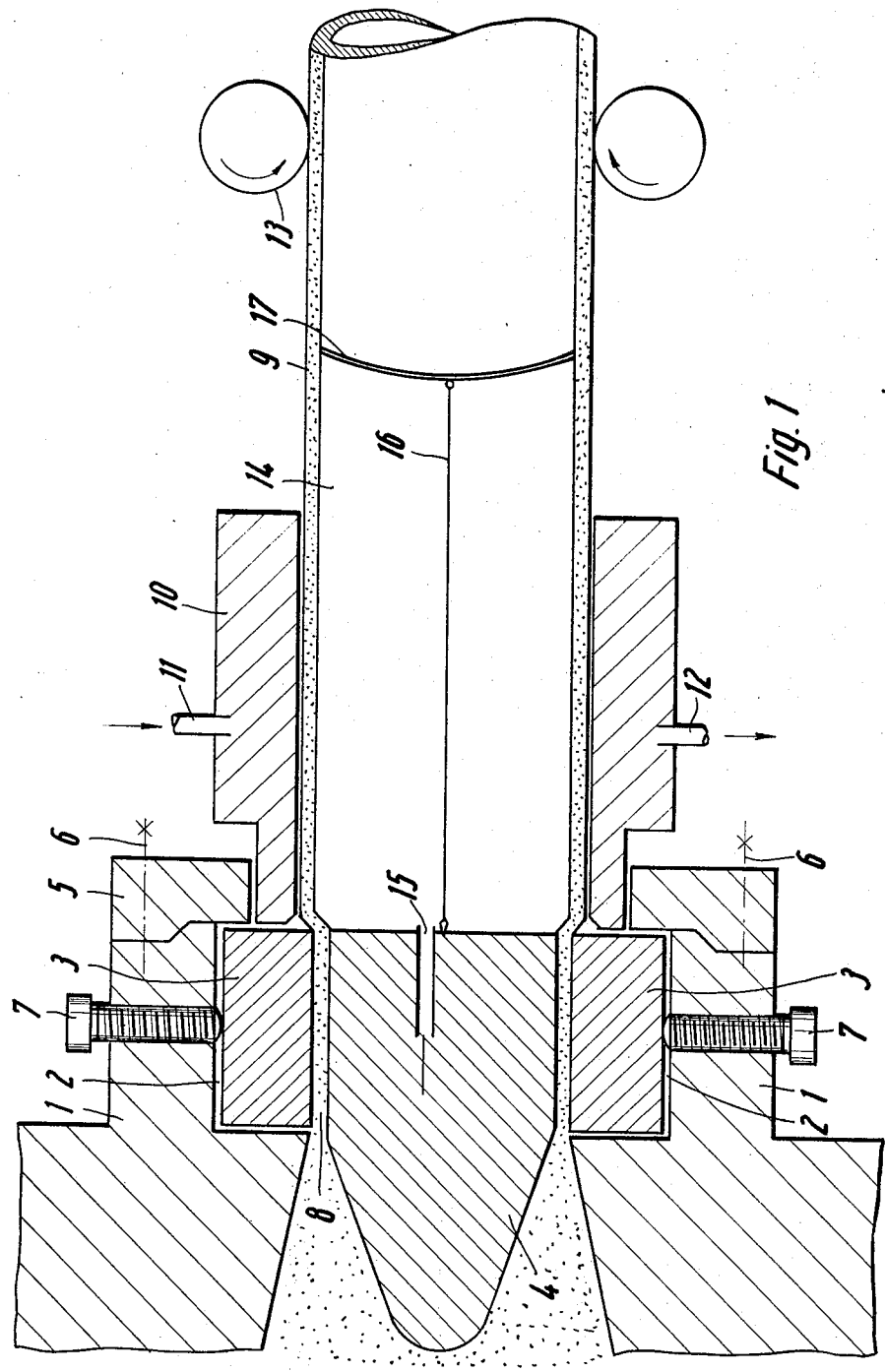

United States Patent [19]
Amoser

[11] 3,792,847
[45] Feb. 19, 1974

[54] PROCESS FOR PREPARING CLOSED HOLLOW PLASTICS SECTION MEMBERS

[75] Inventor: Hans Amoser, Johannisberg, Germany

[73] Assignee: Braas & Co. GmbH, Frankfurt am Main, Germany

[22] Filed: Oct. 4, 1971

[21] Appl. No.: 186,170

[30] Foreign Application Priority Data
Oct. 3, 1970   Germany............................ 2048759

[52] U.S. Cl..................... 264/26, 264/95, 264/98, 264/151, 264/210 R, 264/230, 264/296, 264/DIG. 65
[51] Int. Cl....................... B29c 27/20, B29d 23/04
[58] Field of Search ... 264/209, 210 R, 230, 22, 24, 264/9 B, 25, 26, 95, 150, 148, 294, 296, DIG. 65, 98

[56] References Cited
UNITED STATES PATENTS

| | | | |
|---|---|---|---|
| 2,972,780 | 2/1961 | Boonstra | 264/26 |
| 3,470,046 | 9/1969 | Verdin | 264/230 |
| 3,396,460 | 8/1968 | Wetmore | 264/230 |
| 2,583,330 | 1/1952 | Eckert | 264/26 |
| 3,102,303 | 9/1963 | Lainson | 264/22 |
| 2,821,155 | 1/1958 | Seckel | 264/230 |
| 2,886,853 | 5/1959 | Herman et al. | 264/230 |

FOREIGN PATENTS OR APPLICATIONS

| | | | |
|---|---|---|---|
| 606,963 | 8/1948 | Great Britain | 264/230 |
| 891,505 | 3/1962 | Great Britain | 264/230 |

Primary Examiner—Robert F. White
Assistant Examiner—Jeffery R. Thurlow
Attorney, Agent, or Firm—Browne, Beveridge, DeGrandi & Kline

[57] ABSTRACT

The invention relates to a process for producing closed hollow section members of plastics, more particularly, hard plastics, such as PVC, i.e. polyvinyl chloride. The memory characteristics of a plastic member are employed to center said member upon a forming electrode of a high frequency electrical heating and forming appliance by a first heating step followed by a second heating to the forming temperature for said member and forming said member into a desired article.

7 Claims, 2 Drawing Figures

PROCESS FOR PREPARING CLOSED HOLLOW PLASTICS SECTION MEMBERS

Various methods are known for heating hollow plastics members after extrusion to a temperature at which such components can be given subsequent forming treatment. Time is a vital factor in such heating. Plastics, more particularly PVC (polyvinyl chloride), have stabilizers which act for a predetermined period to inhibit the effect on the plastics end product of heat and light, which tend to alter such product. At the end of the stabilization time, which decreases very rapidly as the temperature rises, PVC, for instance, decomposes with an evolution of chlorine. Consequently, the stabilization time available for the product decreases in proportion as the heating process up to the forming temperature is longer, with the result that the working life of such products is reduced considerably.

Most of the known heating processes, such as heating hollow section members in an oil bath or an air stream or by means of resistances, depend on the very low heat conductivity of the plastics substance; the surface thereof must therefore experience a very heavy thermal loading to ensure that the forming temperature is reached in all zones of a hollow section member. Since the heating time must be very short if the stabilization period is to be long, this process cannot provide a constant uniform temperature throughout the whole wall thickness of hollow section members, yet if the product is to have a high degree of dimensional truth and a long life, it must be heated briefly and uniformly to its forming temperature prior to the forming step.

It is an object of the invention to provide a process enabling hollow section emmbers of plastics, more particularly hard PVC, to be heated rapidly and uniformly to the forming temperature over their whole wall thickness.

According to the invention, therefore, hollow section members produced by extrusion are first enlarged in a sizer, then placed on a former electrode of a high-frequency appliance and heated capacitatively in the high-freuquency field to a temperature such that the hollow section member shrinks by memory effect accurately and centrally on such electrode, whereafter the hollow section members are heated uniformly over their wall thickness in the high-frequency field to a desired forming temperature in preparation for a forming step.

It is known for extruded hollow section members of plastics to be capacitatively heated, but the procedure has so far proved unsatisfactory since it has previously been impossible to center the hollow section members with sufficient accuracy between the outer ring electrode and the inner former or mandrel electrode of a high-frequency appliance, with the result that, due to varying distances between the electrodes, more particularly between the former electrode and the hollow section member, it has been difficult to heat the hollow section member uniformly throughout its wall thickness.

In the novel process, expanding or enlarging the hollow section members after their production by extrusion deliberately introduces a varying crosslinking of the molecule chains in the various zones along the wall thickness of such members because of differing flow conditions in such zones. The reason for these different flow conditions are geometrical and also have to do with the fact that the temperature in the various zones of the hollow section member wall varies. This variation in molecule chain crosslinking causes the so-called "memory" effect: — i.e., when the hollow section member is cooled, the plastics "remembers" its former state — i.e., the extruded state — and tends to return to its original shape in the course of time. Heating helps to speed up this shrinking phenomenon considerably, more particularly if the enlarged member is heated to its enlargement temperature. This otherwise very disturbing memory effect is used for the purposes of the invention for accurate centering to obtain positive and accurate shrinkage of a hollow section member on a former electrode of a high-frequency appliance. This accurate centering is an essential precondition if the hollow section member is to be capacitatively heated in a high-frequency field to a desired forming temperature throughout its wall thickness.

The very rapid capacitative heating proceeds uniformly and simultaneously everywhere in the plastics tube, is independent of the heat conductivity of the plastics and reduces the stabilization time very considerably, so that the working life of the end product is lengthened considerably. Hollow section members of this kind which have been subjected to a uniform forming temperature throughout their wall thickness and which have been compensated for internal stressing introduced into the material during extrusion and/or enlargement are formed in a subsequent working step. Since there is virtually no memory effect in this subsequent step, end products which have been treated in accordance with the invention have a high degree of dimensional truth and dimensional accuracy.

Very advantageously, for stabilization purposes electrically conductive additives, e.g. heavy metal, are added to the plastics prior to extrusion. Capacitative high-frequency heating can then be used very satisfactorily. As additive there can be considered therefore lead (di-basic as stearate — which is also a mould lubricant — or tribasic as sulphate) and calcium stearate. As additives there can also be used tin, manganese, barium and cadmium and inorganic pigments, e.g. iron oxide.

An apparatus for performing the method according to the invention is distinguished in that the facilities for preparing memory effect in a plastics hollow section member, more particularly a circular tube, comprise the following elements:

a. a substantially hollow cylindrical recessed die relief part,
b. a centering die which is disposed in the recesses and which engages around a former,
c. an annular chamber between the centering die and the former for the plastics tube,
d. a substantially hollow cylindrical sizer which is coolable and which follows the centering die in the extrusion direction, and
e. means for removing the cooled tube from the sizer.

Conveniently, an air cushion is produced in the tube near the sizer, the air cushion being bounded, on the side near the extruder by the former and, on the opposite side, by a rubber diaphragm. The compressed air is introduced into the chamber via the former, presses the still plastic plastics outwardly onto the sizer inner walls and thus increases the radius of the resulting plastics tube. Advantageously, the apparatus comprises a reduced number of parts which require no servicing and which are readily replaceable. The centering die can be adapted not only for adjustment eccentrically or centrically of the former but also for diameter adjustment, so that thin-wall and thick-wall plastics tubes can be produced very readily.

According to another advantageous feature of the invention, the capacitative means for heating a hollow plastics section member, more particularly the end of a plastics tube, comprises an electrically insulating self-lubricating substantially hollow cylindrical heat-resistant plastics member, preferably of Teflon, which extends around a live, i.e. not electrically grounded, former electrode of the high-frequency appliance and has extending in spaced relationship around its periphery a second "dead," i.e. earthed, ring electrode. The apparatus is of very simple construction and easy to service, since the electrodes and the plastics member are readily accessible from outside. The hollow cylindrical plastics member is highly resistant to heat and deformation.

Other features, advantages and possible uses of the new invention will become apparent from the following illustrations of embodiments and from the following description.

Figure 2:
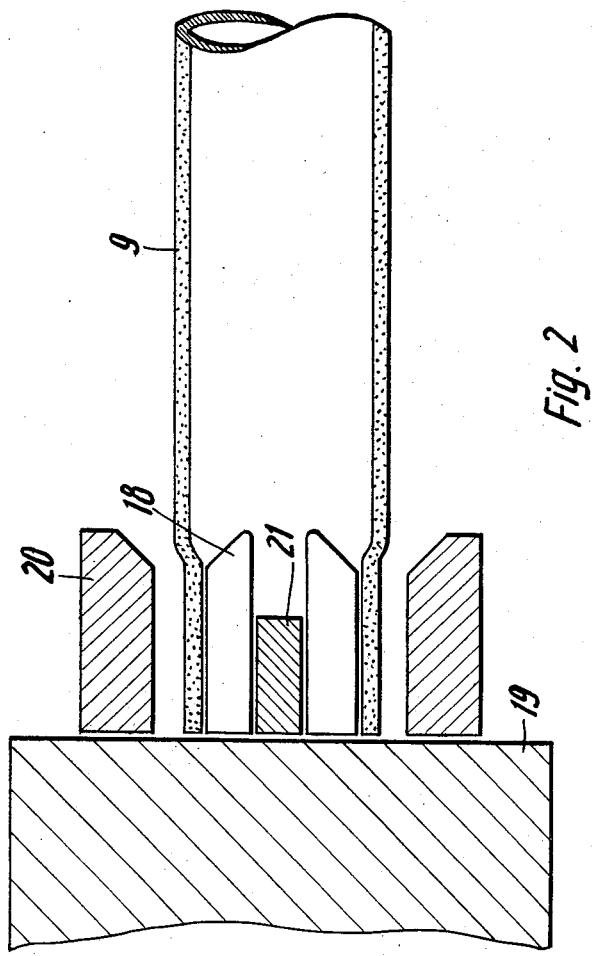

In the drawings:

FIG. 1 is a diagrammatic sectioned elevation of an extruder for preparing the memory effect, and FIG. 2 is a diagrammatic view of an apparatus for capacittively heating a tube end in a high-frequency field.

The apparatus shown in FIG. 1 has in the left-hand part an extruding facility. A substantially hollow cylindrical die relief part 1 is formed with a circular recess or groove or rebate or the like 2 receiving a centering die 3 engaging around a former 4. An end ring 5 screwed at a place 6 to integer 1 retains integer 3 in recess 2. Screws 7 acting on integer 3 can be used to adjust annular chamber 8 in which a plastics tube 9 is formed. Integer 3 can be moved relatively to integer 4 and brought to a smaller diameter to enable plastics tubes having the same or different wall thicknesses to be produced.

Following facility 3 in the extrusion direction is a hollow cylindrical sizer 10 which is cooled by water supplied and removed via lines 11 and 12, respectively. The right-hand end of FIG. 1 shows how the cooled plastics tube 9 can be withdrawn from the extruder by the facility 13. Chamber 14 in tube 9 near sizer 10 experiences a high air pressure, the compressed air being supplied from former 4 through line 15 into chamber 14. Securing means 16 retain a rubber diaphragm 17 which serves to maintain a cushion of compressed air. Heating means (not shown) heat the integers 1 and three. In the zone to the left of former 4, heated plastics flows to the right into chamber 8 to form the plastics tube 9 which is still plastic near the integer 3 and which has already cooled near the sizer 10, against whose inner contours the plastics tube 9 is pressed by the compressed air, and which has become cold and hard outside the sizer 10. As will be apparent, the internal diameter of the sizer 10 is greater than the internal diameter of the integer 3, i.e. the plastics tube is widened as it leaves the integer 3.

The endless plastics tube, preferably of hard PVC, is then parted off into lengths. One end of the length is placed between the two electrodes of a high-frequency appliance shown in FIG. 2 for capacitative heating. The appliance comprises retaining means 19 on which an external hollow cylindrical "dead," electrically earthed, ring electrode 20 is disposed and in the core, inside a Teflon (polytetrafluoroethylene) member 18, a cylindrical "live," not electrically earthed, former or mandrel electrode 21 is disposed. The end of the PVC tube 9, which is not initially centered on the Teflon member 18, is capacitatively heated to a temperature of about 90°C by the high-frequency generator being energized at one-third of its maximum power. The absolute or relative output of the high-frequency generator in all the heating stages depends mainly upon the wall thickness of the PVC tube. At a temperature of 90°C. the tube end shrinks onto the Teflon member 18 because of the accelerated memory effect and is therefore accurately located between the ring electrode 20 and the former electrode 21. Once this condition has been reached, the high-frequency generator is briefly adjusted to its maximum output of 10 kW, power being reduced when the tube end temperature is approximately 110°C. The final temperature which is distributed uniformly throughout the wall thickness of the tube and which is usually below the plasticization temperature is obtained with the high frequency generator operating at 20 percent of its maximum power. The high-frequency generator is controlled automatically in dependence upon time and therefore upon the temperature of the PVC tube end. Using this heating method, a final temperature of approximately 180°C is achieved.

What is claimed is:

1. A process of forming tubular members of hard polyvinyl chloride, the process comprising the steps of:

extruding a tubular member from polyvinyl chloride material,
   after the member is extruded and while heated in a plastic state outwardly enlarging the extruded tubular member to a predetermined degree,
   cutting the expanded tubular member into a predetermined length with the cutting taking place transverse to the axis of the tubular member,
   placing the cut tubular member about a forming mandrel of a high frequency electrical forming appliance,
   heating the cut member in a first heating step by means of the appliance to a temperature equal to the enlargement temperature until the cut member shrinks by memory effect uniformly on the mandrel,
   further heating the cut member in a second heating step by means of the appliance to a desired temperature for forming the tubular member, and
   forming the cut tubular member into a desired product.

2. The process defined in claim 1 wherein the tubular member has a cylindrical cross section and wherein the tubular member is expanded against a hollow cylindrical sizing member positioned adjacent and in axial alignment with the outlet of the extruder through which the member is extruded, and wherein the tubular member is expanded by the application of fluid pressure within the tubular member to expand it radially outwardly against the sizing member.

3. The process of forming a tubular member in accordance with claim 1 wherein an additive is added to the polyvinyl chloride prior to extruding the tubular member, the additive being chosen from the following materials: lead, calcium stearate, tin, manganese, barium, cadmium and iron oxide.

4. In a method of centering a tubular plastic member having an elastic memory characteristic on a forming electrode in a high frequency electrical heating and forming appliance to be used for heating the tubular member to a desired forming temperature for forming the tubular member into a desired product; the improvement comprising:

heating the tubular member to the degree where it still possesses elastic memory and enlarging the tubular member to be greater in diameter than the forming electrode of the appliance, placing the tubular member about the forming electrode and heating the tubular member in a first heating step to a temperature equal to the enlargement temperature uniformly shrinking the tubular member by memory effect about the forming electrode to thereby accurately center the tubular member on the forming electrode, further heating the tubular member in a second heating step while centered on the forming electrode through means of the appliance to a desired forming temperature for forming the tubular member, and forming the tubular member into a desired product.

5. The process defined in claim 4 wherein a polytetrafluoroethylene electrode forming member is employed with an electrically live electrode core and wherein there is fruther employed an electrically grounded outer electrode ring also of polytetrafluoroethylene concentrically surrounding the forming electrode.

6. The process defined in claim 1 wherein in said first heating step said cut member is heated by means of said high frequency electrical forming applicance to a temperature of about 90° C.

7. The process defined in claim 6 wherein in said second heating step said cut member is heated by means of said high frequency electrical forming appliance to a temperature of approximately 180° C.

* * * * *